United States Patent [19]

Moriya et al.

[11] Patent Number: 5,048,001
[45] Date of Patent: Sep. 10, 1991

[54] LOAD CORRECTION METHOD FOR AN INFORMATION RETRIEVAL APPARATUS

[75] Inventors: Mitsuro Moriya, Neyagawa; Masayuki Shibano, Izumisano; Hiroyuki Yamaguchi; Shinichi Yamada, both of Hirakata; Katsuya Watanabe, Suita, all of Japan

[73] Assignee: Matsushita Electric Industrial Co., Ltd., Osaka, Japan

[21] Appl. No.: 504,289

[22] Filed: Apr. 4, 1990

[30] Foreign Application Priority Data

Apr. 7, 1989 [JP] Japan .................................. 1-88866

[51] Int. Cl.[5] ........................ G11B 21/08; G11B 7/085
[52] U.S. Cl. .................................. 369/44.32; 369/32; 369/44.28
[58] Field of Search ................. 369/32, 44.32, 44.27, 369/44.28, 44.29; 360/73.03; 769/44.27, 44.28

[56] References Cited

U.S. PATENT DOCUMENTS 4,331,987  5/1982  Oda et al. .
4,901,299  2/1990  Nakatsu ................................ 369/32

FOREIGN PATENT DOCUMENTS

0274420A1  7/1988  European Pat. Off. .
0277799A2  8/1988  European Pat. Off. .
0324962A2  7/1989  European Pat. Off. .
54-92155   7/1979  Japan .
56-153562  11/1981 Japan .
57-147168  9/1982  Japan .
60-35377   2/1985  Japan .
60-239943  11/1985 Japan .

Primary Examiner—Roy N. Envall, Jr.
Assistant Examiner—Hindi Nabil
Attorney, Agent, or Firm—Wenderoth, Lind & Ponack

[57] ABSTRACT

In an apparatus for searching a desired track of a recording carrier by transferring and controlling the reproduction position of the pickup for reproducing the signal recorded on a recording carrier on the basis of reference transfer information, the traveling load is measured, and the value of the reference transfer information is corrected according to this measured value, so that the desired track may be searched stably. The transfer motor is driven so that the reproduction position may move at a constant velocity, and the traveling load is measured. The transfer motor is driven so that the moving speed of the reproduction position or the time for moving a specified distance may be predetermined specific value, and by this driving signal, the value corresponding to the traveling load is determined.

10 Claims, 3 Drawing Sheets

LOAD CORRECTION METHOD FOR AN INFORMATION RETRIEVAL APPARATUS

BACKGROUND OF THE INVENTION

1. Field of the Invention

The present invention relates to a retrieval apparatus for searching a desired information track on a recording carrier possessing multiple information tracks, and for recording a signal on the recording carrier or reproducing a recorded signal during tracking and controlling so that the recording or reproducing position is located on the desired information track.

2. Description of the Prior Art

According to an optical recording and reproducing apparatus, as a conventional example, a light beam generated from a light source such as semiconductor laser is converged and emitted on a disc-shaped recording carrier rotating at a specific speed, and a signal is recorded on the recording carrier or the signal recorded on the recording carrier is reproduced.

On this recording carrier, tiny tracks of 0.6 micrometer in width and 1.6 micrometers in pitch are formed spirally or concentrically. When recording a signal on the recording carrier or when reproducing a signal recorded on the recording carrier, the tracking is controlled so that the light beam may be always located on the track. The error signal of this tracking control, that is, the track deviation signal expressing the positional deviation between the light beam and track on the recording carrier is obtained by receiving the reflected light or transmitted light from the recording carrier using a photosensor.

As the structure of the actuator for tracking control, for example, a two-actuator composition is known, which comprises a first actuator for moving the converging lens in order to move the light beam on the recording carrier in the widthwise direction of the track, and a second actuator for moving the first actuator in the radial direction of the recording carrier (e.g. the Japanese Laid-open Patent No. 57-147168).

As the first actuator, meanwhile, the structure of rotating a reflecting mirror to move the light beam on recording carrier in the widthwise direction of the track is known (e.g. the Japanese Laid-open Patent No. 56-153562).

In the case of tracking control by using two actuators as mentioned above, the track deviation signal is applied to the first and second actuators, and the tracking is controlled so that the light beam on the recording carrier may be always situated on the track. The relation of the first and second actuators is such that the first actuator mainly moves as for the high speed track deviation, while the second actuator is mainly responsible for the low speed track deviation.

Multiple tracks are formed on the recording carrier, and a retrieval means is indispensable for searching a track in which desired information is recorded.

Retrieval of a desired track is effected on the basis of the address given to each track on the recording carrier, and more specifically the difference between the address of the track being reproduced at the present and the address of the desired track is determined, and the second actuator is driven so that the light beam on the recording carrier may cross the tracks by the number of tracks corresponding to the obtained address difference while deactivating the tracking control, and then tracking control is started again to search the desired track (e.g. the Japan Laid-open Patent No. 54-92155).

In another known method, capable of moving the light beam on the recording carrier over a wide range, tracking control and retrieval of a desired track are realized using one actuator only (e.g. the Japanese Laid-open Patent No. 60-239943).

In the apparatus for performing tracking control by using two actuators as stated above, retrieval of desired track is effected by moving the first actuator by the second actuator, but since the transfer load changes depending on the state of installation of the apparatus at this time, retrieval may be unstable. For example, when the apparatus is installed at an inclination to the moving direction of the second actuator, the transfer load changes by the own weight. To prevent this, it is proposed to correct by measuring the inclination of the apparatus by using an acceleration sensor (e.g. the Japanese Laid-open Patent No. 60-35377). In this method, however, not only the cost is raised by using the acceleration sensor, but also the loads of friction or wire materials or their changes in the time course cannot be improved.

In other words, the friction generated when transferring the first actuator by the second actuator or the transfer load due to the wire materials for feeding current to the first actuator differs depending on the position of the first actuator. For example, the transfer load when the first actuator is positioned near the inner periphery of the recording carrier and that when positioned near the outer periphery of the recording carrier are different. As the transfer load thus varies, in the conventional apparatus, not only the discrepancy of the retrieval time increases, but also the retrieval operation becomes unstable, which may sometimes lead to the occurrence of retrieval errors or an extreme lowering of reliability. The same holds true with the apparatus composed to perform tracking control using one actuator.

SUMMARY OF THE INVENTION

It is hence a primary object of the invention to present an simple load correction method capable of stably searching a desired track, even if the transfer load fluctuates, while eliminating the above-mentioned conventional demerits.

To achieve the above object, the first load correction method of the invention relates to an apparatus for searching a desired track by moving and controlling the transfer means on the basis of the reference transfer signal, comprising means for reproducing a signal recorded on the recording carrier and means for transferring the reproduction position on the recording carrier of the reproducing means approximately in the widthwise direction of the track, wherein the transfer means is driven on the basis of a specific transfer signal to keep the moving speed of the reproduction position at a constant velocity, the moving speed of the reproduction position at this time is measured, the value of the specific transfer signal to keep the moving speed of the reproduction position at specified constant velocity is determined, and the value of the reference transfer signal for searching a desired track is corrected according to this value.

In the second load correction method of the invention, the transfer means is driven on the basis of a specific transfer signal to keep the moving speed of the reproduction position at a constant velocity, the time for the reproduction position to move a specific distance at this time is measured, the value of the specific transfer signal to keep this moving time at a specific time is determined, and the value of the reference transfer signal is corrected according to this value.

The invention, according to the first method, measures the load by determining the value of the specific transfer signal for keeping the moving speed of the reproduction signal at a specified constant velocity, and searches after correcting the value of the reference transfer signal for searching a desired track according to this value, and therefore effects of load fluctuations may be eliminated, and the desired track may be searched very stably. In the second method, similarly, the load is measured by determining the value of the specific transfer signal for keeping the moving time of the reproduction position for a specific distance at a specific time, and the value of the reference transfer signal is corrected according to the load, so that retrieval of desired track may be stable. That is, by applying the invention, discrepancy of the traveling load of the apparatus, and traveling load changes due to the state of installation of the apparatus or secular changes are corrected, and retrieval is extremely stable, so that the stability and reliability of the apparatus may be significantly enhanced.

DESCRIPTION OF THE PREFERRED EMBODIMENTS

Figure 1:
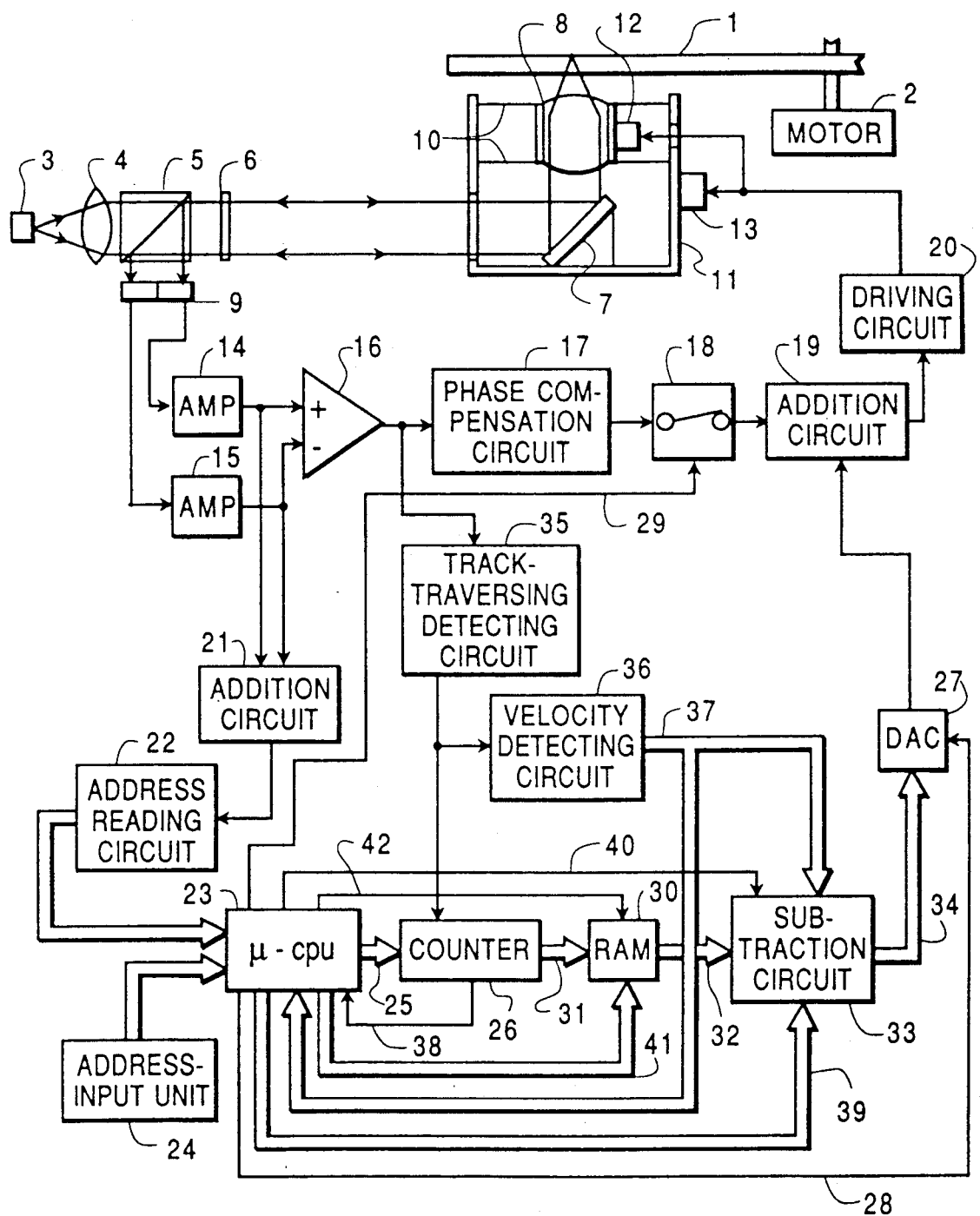
FIG. 1 is a block diagram for explaining the first load correction method of the invention for correcting the load by measuring the traveling load by measuring the moving speed.

FIG. 1 is a block diagram of an embodiment for explaining the first method of the invention for measuring the traveling load by measuring the velocity.

In FIG. 1, a disc-shaped recording carrier 1 is mounted on the rotary shaft of a motor 2, and is rotated at a specific speed. On the recording carrier 1 there are spiral tracks of about 0.6 micrometer in width and about 1.6 micrometers in track pitch in which signals are recorded, and address signals for distinguishing the track position are preliminarily recorded in the tracks. The light beam generated by a light source 3, such as semiconductor laser, is passed through a coupling lens 4 to be formed into parallel light, which further runs through a polarized beam splitter 5 and a quarter-wave plate 6, and is reflected by a reflecting mirror 7 to be converged and emitted on the recording carrier 1 by a converging lens 8. The reflected light of the light beam reflected by the recording carrier 1 passes through the converging lens 8 and is reflected by the reflecting mirror 7, and further passes through the quarter-wave plate 6 and is reflected by the polarized beam splitter 5, and is emitted to a photosensor 9. The converging lens 8 is mounted on a frame 11 by way of a plate spring 10. A coil (not shown) of a focus actuator is fitted to the converging lens 8, and when an electric current flows in this coil, the converging lens 8 is designed to move in a direction vertical to the plane of the recording carrier 1 in response to the electromagnetic force applied to the coil. The focus of the converging lens 8 is controlled so that the light beam emitted to the recording carrier 1 may be always in a specific converged state, but this explanation is omitted here because it is not directly related with the invention.

The actuator for tracking is composed of a coil 12 fitted to the converging lens 8 and a permanent magnet (not shown) of the frame of the apparatus, and when an electric current flows in the coil 12, the converging lens 8 receives a force in the radial direction of the recording carrier 1, that is, in the widthwise direction of the track on the recording carrier 1, in response to the electromagnetic force applied to the coil 12. The plate spring 10 is likely to expand and contract in a direction vertical to the plane of the recording carrier 1, and is less likely to expand and contract in the radial direction of the recording carrier 1. Therefore, when the converging lens 8 is moved by the force applied to the coil 12, the frame 11 receives the force through the plate spring 10, and moves in the radial direction of the recording carrier 1 by this force. The reflecting mirror 7 is attached to the frame 11, and it is designed to move in the radial direction of the recording carrier 1 together with the frame 11. A coil 13 is fitted to the frame 11, and when an electric current flows in the coil 13, the coil 13 is designed to receive a force in the radial direction of the recording carrier 1 by the action with the permanent magnet (not shown) mounted on the frame of the apparatus. When the frame 11 moves in the radial direction of the recording carrier 1 by the force applied to the coil 13, the converging lens 8 moves in the radial direction of the recording carrier 1 by receiving force through the plate spring 10. The coil 13 is an auxiliary one, and it may be omitted if the mass of the frame 11 and reflecting mirror 7 is small. Therefore, in the embodiment in shown FIG. 1, it may be assumed that tracking control is substantially executed by one actuator. The light source 3, coupling lens 4, polarized beam splitter 5, quarter-wave plate 6 and photosensor 9 are fixed on the frame (not shown) of the apparatus.

The photosensor 9 is divided into two halves, and its output is fed to amplifiers 14, 15. The signals of the amplifiers 14, 15 are fed to a differential amplifier 16, and the differential amplifier 16 delivers a signal depending on the difference of the two signals. This signal of the differential amplifier 16 is a signal expressing the positional deviation of the track and the light beam converged on the recording carrier 1, that is, a track deviation signal. The signal of the differential amplifier 16 is applied to the coils 12 and 13 by way of a phase compensation circuit 17 for compensating the phase of the tracking control system, a switch 18, an addition circuit 19, and a driving circuit 20 for amplifying the electric power. Therefore, the converging lens 8 is driven depending on the signal from the differential amplifier 16, and tracking is controlled so that the light beam converted on the recording carrier 1 may be always positioned on the track. The switch 18 is for deactivating the tracking control.

Retrieval of a desired track is further described below. An addition circuit 21 adds the signals of the amplifiers 14 and 15, and the added signal is transmitted to an address-reading circuit 22. The address-reading circuit 22 reads the address of the track in which the light beam on the recording carrier 1 is positioned, and sends out the read address to a microcomputer 23. When the address of a desired track (N0) is entered in an address input unit 24, the microcomputer 23 reads the address (N1) of the track in which the light beam on the recording carrier 1 is positioned, and calculates (N0−N1), and sets a value depending on the distance and direction to the desired track in a counter 26 through a line 25, and makes a digital-to-analog converter 27 ready to operate through a line 28, while opening the switch 18 through a line 29 to inactivate tracking control. A random access memory (RAM) 30 is for converting the value of the counter 26 to an ideal value in order to position the frame 11 at a desired track at high speed, and in the RAM 30 is stored, as described later, the reference velocity information to the corrected retrieval distance by measuring the traveling load of the frame 11 when turning on the power source of the apparatus or when mounting the recording carrier 1. When the value of the counter 26 is fed through a line 31, the RAM 30 delivers a value corresponding to the value of the counter 26, and this digital signal is sent to a subtraction circuit 33 through a line 32. The subtraction circuit 33 sends a signal through a line 34 to the D/A converter 27 for converting a digital signal into an analog signal. The signal of the D/A converter 27 is added to the coils 12, 13 through the addition circuit 19 and driving circuit 20, and therefore the frame 11 moves in a direction toward the desired track. As the frame 11 moves, the track-traversing signal of the light beam on the recording carrier 1 is delivered to the differential amplifier 16, and a track-traversing detecting circuit 35 delivers a track-traversing signal by shaping the waveform of the signal of the differential amplifier 16. The counter 26 counts the signals from the track-traversing detecting circuit 35, and delivers, moment by moment, the value corresponding to the distance to the desired track. Additionally, a velocity detecting circuit 36 measures the period of the signal of the track-traversing detecting circuit 35, and detects the moving velocity of the light beam on the recording carrier 1, and sends the detected value to the subtraction circuit 33 through a line 37. The subtraction circuit 33 calculates the difference between the value of the RAM 30 and the value of the velocity detecting circuit 36, and sends the calculated value to the D/A converter 27 through the line 34. Therefore, the frame 11 is transferred while the velocity is controlled so that the value of the velocity detecting circuit 36 may be equal to the value of the RAM 30. When the light beam on the recording carrier 1 reaches the desired track, the counter 26 sends this information to the microcomputer 23 through a line 38. The microcomputer 23, in turn, stops the output of the D/A converter 27 through the line 28. At the same time, the switch 18 is short-circuited to actuate the tracking control. Afterwards, reading the address again, retrieval is complete when the read address coincides with the address of the desired track, and if it does not coincide, the same retrieval action is repeated until the desired track is searched.

In the embodiment shown in FIG. 1, when turning on the power source of the apparatus or when mounting the recording carrier 1, the traveling load of the frame 11 is measured, and the reference velocity information to standard retrieval distance preliminarily stored in the microcomputer 23 is corrected on the basis of this information, and the corrected reference velocity information is stored in the RAM 30. This constitution is further described below.

When measuring the traveling load of the frame 11, the microcomputer 23 sends a signal through a line 40, and the operation of the subtraction circuit 33 is changed over so as to calculate the difference between the value sent by the microcomputer 23 to the subtraction circuit 33 through a line 39 and the value of the velocity detecting circuit 36. Furthermore, the microcomputer 23 positions the light beam on the recording carrier 1 near the second track (Ny), in the first place, in order to reciprocate between two points, near the predetermined first track (Nx) and near the second track (Ny).

Afterwards, reading the address signal (N2) of the track in which the light beam on the recording carrier 1 is positioned, the difference from the first track (Nx) is determined (Nx−N2), and the value depending on the distance and direction is set in the counter 26 through the line 25, and a predetermined specific reference velocity information (X1) is sent to the subtraction circuit 33 through the line 39, and the D/A converter 27 is set in a ready state through the line 28, while the switch 18 is opened through the line 29 to deactivate tracking control. The subtraction circuit 33 calculates the difference of the value of the microcomputer 23 and the value of the velocity detecting circuit 36, and sends the result to the D/A converter 27, and therefore the frame 11 is controlled in speed so as to move at a specific target velocity (Vref) being predetermined in response to the reference velocity information (X1). The microcomputer 23 reads the value of the moving speed (Vreal) of the frame 11 from the velocity detecting circuit 36 through the line 37. The target velocity (Vref) corresponding to the reference velocity information (X1) is set on the basis of the standard traveling load. Therefore, if the traveling load of the frame 11 is greater than the standard traveling load, or if it is smaller, an error occurs in the velocity control, and the real moving speed (Vreal) of the frame 11 does not coincide with the target velocity (Vref).

For example, when it is greater than the standard traveling load, the relation is $$|Vref| > |Vreal|$$

(which means that the absolute value of Vref is greater than that of Vreal). The microcomputer sends specific reference velocity information $(X1 + \Delta X1)$ to the subtraction circuit 33, and reads the moving velocity (Vreal) of the frame 11. If $|Vref| > |Vreal|$ again, specific reference velocity information $(X1 + \Delta X1 + \Delta X2)$ is sent to the subtraction circuit 33, or if $|Vref| < |Vreal|$, specific reference velocity information $(X1 + \Delta X1 - \Delta X2)$ is sent thereto, and the value of the moving velocity (Vreal) of the frame 11 is read.

The microcomputer 23 repeats the above operation until reaching $$|Vref| - |Vreal| < K$$

and the reference velocity information (X) to be sent to the subtraction circuit 33 with respect to the transfer load of the frame 11 is determined (K is a positive real number). In this case, by decreasing the value to be added or subtracted gradually in this way $$|X1| > |\Delta X1| > |\Delta X2|$$

by every repetition, the converging time may be shortened.

Or the value to be added or subtracted may be set at a small specific value.

When the counter 26 sends a coincidence signal to the microcomputer 23 through the line 38, the microcomputer 23 deactivates the D/A converter 27, and the switch 18 is short-circuited through the line 29 to start tracking control, and the address (N3) of the track is read.

Consequently, the microcomputer 23 determines the difference (Ny−N3) from the predetermined second track address (Ny), and the value corresponding to the distance and direction is set in the counter 26 through the line 25, and similarly the frame 11 is moved toward the second track (Ny), and the reference velocity information (Y) to be sent to the subtraction circuit 33 with respect to the transfer load of the frame 11 is determined. The values (X−X1), (Y−Y1) are calculated, and the values to the traveling load are determined.

The difference between the reference velocity information values (X) and (Y) means that the traveling load of the frame 11 varies with the direction. For example, the value is different if the apparatus is installed at an inclination to the traveling direction of the frame 11.

If the measurement of the traveling load of the frame 11 is not completed in one reciprocal stroke, it is repeated plural times. If it has not converged after the specified number of repetitions, it is desired that the operation of the apparatus be stopped, thereby indicating an abnormality via an error display.

It takes time until the velocity control responds, and for example by measuring the moving velocity of the frame 11 to the reference velocity information sent to the subtraction circuit 33 when moving once from the track (Nx) to (Ny) and measuring the traveling load by repeating plural times, it is possible to measure at a higher precision. In this way, moreover, the distance of tracks (Nx) and (Ny) may be shortened, and it is therefore possible to measure the traveling load to various locations, such as the inner periphery, intermediate periphery and outer periphery of the recording carrier 1. Or by measuring the velocity plural times while moving once from track (Nx) to (Ny) and determining the average velocity, a value of a higher precision will be obtained.

When the measurement of traveling load is complete, the microcomputer 23 corrects the reference velocity information to the standard retrieval distance preliminarily stored according to this information, and the corrected reference velocity information is stored in the RAM 30.

Figure 2:
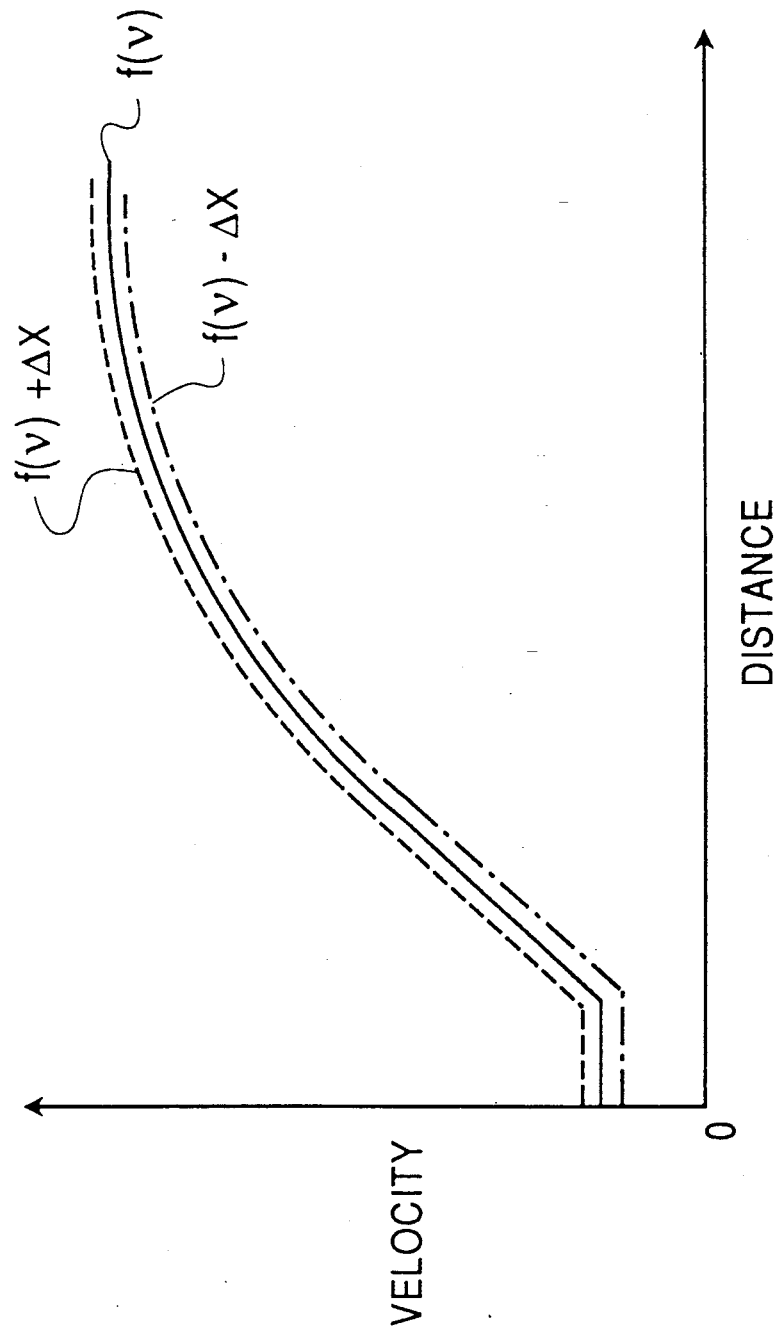
FIG. 2 is a graph showing the relation between the retrieval distance and the reference velocity information.

This operation is explained below while referring to FIG. 2. FIG. 2 shows the distance between the light beam on the recording carrier 1 and the desired track, that is, expresses the value of the counter 26 shown in FIG. 1 on the axis of abscissas and the absolute value of the reference velocity information to be set in the RAM 30 on the axis of ordinates. The solid line denotes the absolute value f(v) of the reference velocity information to the standard retrieval distance preliminarily stored in the microcomputer 23. For example, when the apparatus is installed at an inclination to the traveling direction of the frame 11, the quantity load equivalent to the value $\Delta X$ when the frame 11 moves from the inner periphery to the outer peripheral direction is large, and the quantity value equivalent to the value $-\Delta X$ when moving in the opposite direction is measured to be small, the microcomputer 23 stores the value $(f(v)+\Delta X)$ indicated by the dashed line as the reference velocity information for moving from the inner periphery to the outer peripheral direction, in the RAM 30, together with the value $(f(v)-\Delta X)$ indicated by the dot-dashed line as the reference velocity information for moving from the inner periphery to the outer peripheral direction, through the data line 41 and write line 42. At this time, the address of the RAM 30 is specified by setting the address in the counter 26 through the line 25 as the microcomputer 23 stops the counting action of the counter 26. As a result, the traveling load of the frame 11 is corrected, and the retrieval of the desired track conducted after correction is extremely stable.

The traveling load due to wire materials or the like of the actuator differs with the location of the frame 11. For example, by measuring the traveling loads on the inner periphery, intermediate periphery and outer periphery and correcting similarly, retrieval will be further stabilized.

As the distance becomes longer, the value $|\Delta X/f(v)|$ becomes smaller, and the effect of the traveling load is less. Therefore, to correct the traveling load, only the short distance portion is corrected, and the long distance portion is not. In this case, when the long distance portion is designed to have the standard reference velocity information and the read-only memory (ROM) is used, the circuit scale may be reduced.

Additionally, by using a processor having high speed operation functions, and performing a series of processing of the microcomputer 23, counter 26, RAM 30 and subtraction circuit 33 using software, the result may be sent to the D/A converter 27.

Figure 3:
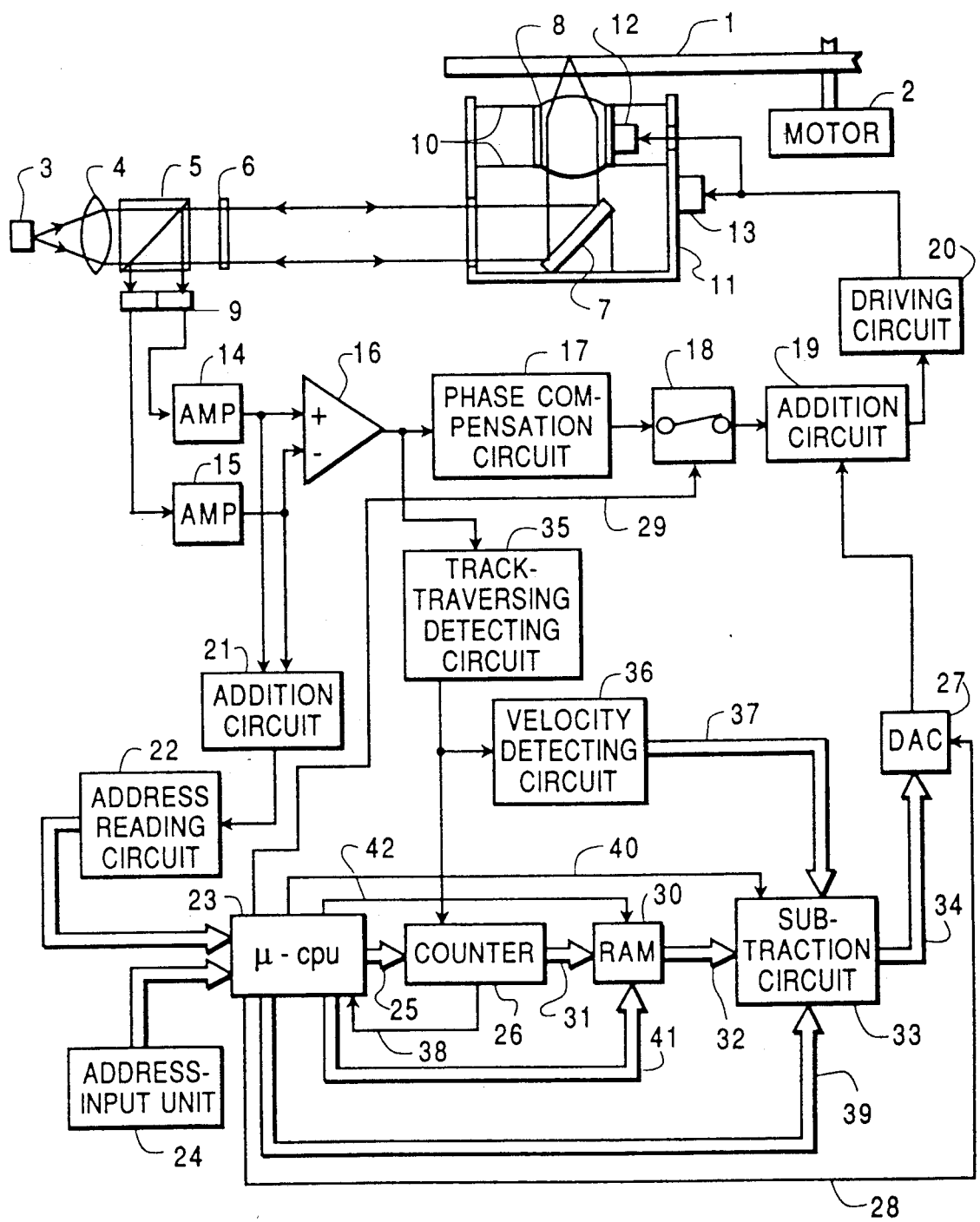
FIG. 3 is a block diagram for explaining the second load correction method of the invention for correcting the load by measuring the traveling load by measuring the moving time.

FIG. 3 is a block diagram of an embodiment for explaining the second method of the invention for measuring the traveling load by measuring the time. The same parts as shown in FIG. 1 are not again explained.

When measuring the traveling load of the frame 11, the microcomputer 23 changes over the operation of the subtraction circuit 33 through the line 40 so that the subtraction circuit 33 calculates the difference between the value sent from the microcomputer 23 through the line 39 and the value of the velocity detecting circuit 36. Afterwards, reciprocal motions are effected plural times between two points, near the predetermined first track (Nx) and near the second track (Ny).

First, the traveling load is measured in the moving direction from near the second track (Ny) to near the first track (Nx). That is, the address (N2) of the track near the second track (Ny) on which the light beam on the recording carrier 1 is located is read, and the difference from the first track (Nx) is determined (Nx−N2), and the value depending on the distance and direction is set in the counter 26, and the predetermined specific reference velocity information (X1) is sent to the subtraction circuit 33, and the frame 11 moves at specific target velocity (Vref) corresponding to the reference velocity information (x1). The microcomputer 23 calculates the time from the moment of application of the move signal to the frame 11, that is, the actuation of the D/A converter 27, until the coincidence signal is sent from the counter 26. If this measured time (Treal) is greater than the predetermined specific time (Tref), the microcomputer 23 moves the light beam on the recording carrier 1 to near the second track (Ny), and the specific reference velocity information of $(X1+\Delta X1)$ is sent to the subtraction circuit 33, and similarly the moving time when transferring from near the second track (Ny) to near the first track (Nx) is measured. If the value of this moving time (Treal) is again (Tref<Treal), the specific reference velocity information (X1+ΔX1+ΔX2) is sent to the subtraction circuit 33, and if (Tref>Treal), the specific reference velocity information (X1+ΔX1−ΔX2) is sent thereto, and the moving time (Treal) of the frame 11 is measured.

The microcomputer 23 repeats the same operation until reaching

|Tref−Treal|<Tk, and the reference velocity information (X) to be sent to the subtraction circuit 33 to the transfer load of the frame 11 is determined (Tk is a positive real number).

Next, the traveling load in the direction of moving from near the first track (Nx) to near the second track (Ny) is similarly measured. That is, the specific reference velocity information is sent to the subtraction circuit 33, and the moving time is measured by moving from near the first track (Nx) on the recording carrier 1 to near the second track (Ny), and the reference velocity information (Y) regarding this moving time as specific time is determined.

When measurement of the traveling load is complete, as in the embodiment shown in FIG. 1, the microcomputer 23 corrects the reference velocity information with respect to the preliminarily stored standard retrieval distance on the basis of this information, and stores the corrected reference velocity information in the RAM 30. Therefore, since the traveling load of the frame 11 is corrected, the discrepancy of the retrieval time becomes small, and the stability is extremely enhanced.

The invention has thus been described in detail, but the invention is not limited to the foregoing embodiments alone.

For example, in the first load correction method of the invention, it is also possible to constitute so as to transfer continuously in one direction while reading the address of the track, calculate the transfer speed by measuring the time required for moving the specified address difference, and determine the reference velocity information regarding the calculated speed as the specified velocity. Thus, the velocity errors of the velocity detecting circuit 36 due to dropout of the recording carrier 1 or the like, or the transfer distance errors may be eliminated, so that correction of a higher precision may be realized.

In the traveling load measurement according to the second load correction method of the invention, instead of measuring in one direction each, it may be also possible to measure in two directions while making one reciprocal motion between two points, near the predetermined first track (Nx) and near the second track (Ny). As a result, the number of reciprocal strokes between two points near the first track (Nx) and near the second track (Ny) is reduced to half, and it is possible to measure the traveling load at a higher speed. Or by measuring the time while moving in one direction, for example, from the outer periphery to the inner peripheral direction by a specific distance each, it is possible to determine the reference velocity information to be sent to the subtraction circuit 33 with respect to the transfer load of the frame 11. Or by continuously transferring in one direction while reading the address of the track, it is also possible to measure the time required for moving the specific address distance and determine the reference velocity information by regarding the moving time for the specified address difference as the specific time.

Or by measuring the traveling load at plural locations such as inner periphery, intermediate periphery and outer periphery, it may be possible to correct on the basis of the average value thereof.

Still more, in the case of retrieval of a desired track, if longer or shorter than the predetermined specific time for the distance, the traveling load may be measured again, and corrected.

Needless to say, the invention may be applied to optical reproducing apparatus, capacitive reproducing apparatus, and magnetic reproducing apparatus as well.

What is claimed is:

1. A load correction method for compensating a variation of a load against a movement of an optical head actuator in an information retrieval apparatus which retrieves information from a recording carrier on which information is recorded on a plurality of information tracks formed on the recording carrier by using an optical head which forms a light spot on the recording carrier, the information retrieval apparatus being operable in a velocity control mode in which the optical head actuator drives the optical head so as to move the light spot in a direction traversing the tracks to reach a desired track while measuring a velocity of the light spot traversing the tracks, comparing a measured velocity signal indicative of the measured velocity of the light spot with a reference velocity signal, and controlling the optical head actuator so that a difference between the measured velocity signal and the reference velocity signal becomes zero to thereby move the light spot at a velocity corresponding to the reference velocity signal, said method comprising the steps of:
   (1) setting a value of the reference velocity signal to a standard value by which the light spot moves at a predetermined velocity in the velocity control mode when the load against the optical head actuator is a standard load;
   (2) operating information retrieval apparatus in the velocity control mode while measuring the velocity of said light spot, comparing the measured velocity with the predetermined velocity, and when the measured velocity is not equal to the predetermined velocity, increasing or decreasing the value of the reference velocity signal by a predetermined value;
   (3) repeating said step (2) until the measured velocity becomes substantially equal to the predetermined velocity;
   (4) calculating, as a load correction value indicative of a difference between an actual load and the standard load, a difference between the value of the reference velocity signal after completing said step (3) and the standard value of the reference velocity signal; and
   (5) correcting the reference velocity signal based on the standard value and the load correction value to obtain a new reference velocity signal by which the light spot moves at the predetermined velocity in the velocity control mode under a presence of the actual load against the optical head actuator.

2. A method according to claim 1, wherein the optical head actuator drives the optical head so as to move the light spot in opposite first and second directions, and wherein said method further comprises separately calculating the load correction value for each of the first and second directions.

3. A method according to claim 2, further comprising separately obtaining the new reference velocity signal for each of the first and second directions.

4. A method according to claim 1, wherein the new reference velocity signal is obtained by adding the load correction value to the standard value of the reference velocity signal.

5. A method according to claim 1, wherein the predetermined value by which the value of the reference velocity signal is increased or decreased in said step 2) is decreased with a decrease in a difference between the measured velocity and the predetermined velocity.

6. A load correction method for compensating a variation of a load against a movement of an optical head actuator in an information retrieval apparatus which retrieves information from a recording carrier on which information is recorded on a plurality of information tracks formed on the recording carrier by using an optical head which forms a light spot on the recording carrier, the information retrieval apparatus being operable in a velocity control mode in which the optical head actuator drives the optical head so as to move the light spot in a direction traversing the tracks to reach a desired track while measuring a velocity of the light spot traversing the tracks, comparing a measured velocity signal indicative of the measured velocity of the light spot with a reference velocity signal, and controlling the optical head actuator so that a difference between the measured velocity signal and the reference velocity signal becomes zero to thereby move the light spot at a velocity corresponding to the reference velocity, said method comprising the steps of:

(1) setting a value of the reference velocity signal to a standard value by which the light spot moves at a predetermined velocity in the velocity control mode when the load against the optical head actuator is a standard load, and setting a predetermined time required for the light spot to move between predetermined first and second tracks at the predetermined velocity under a presence of the standard load;

(2) operating the information retrieval apparatus in the velocity control mode to move the light spot between the first and second tracks while measuring a time required for the light spot to move between the first and second tracks, comparing the measured time with the predetermined time, and, when the measured time is not equal to the predetermined time, increasing or decreasing the value of the reference velocity signal by a predetermined value;

(3) repeating said step (2) until the measured velocity becomes substantially equal to the predetermined velocity;

(4) calculating, as a load correction value indicative of a difference between an actual load and the standard load, a difference between the value of the reference velocity signal after completing said step 3) and the standard value of the reference velocity signal; and (5) correcting the reference velocity signal based on the standard value and the load correction value to obtain a new reference velocity signal by which the light spot moves at the predetermined velocity in the velocity control mode under a presence of the actual load against the optical head actuator.

7. A method according to claim 6, wherein the optical head actuator drives the optical head so as to move the light spot in opposite first and second directions, and wherein said method further comprises separately calculating the load correction value for each of the first and second directions.

8. A method according to claim 7, further comprising separately obtaining the new reference velocity signal for each of the first and second directions.

9. A method according to claim 6, wherein the new reference velocity signal is obtained by adding the load correction value to the standard value of the reference velocity signal.

10. A method according to claim 6, wherein the predetermined value by which the value of the reference velocity signal is increased or decreased in said step 2) is decreased with a decrease in a difference between the measured time and the predetermined time.

* * * * *